United States Patent
Dunko

(10) Patent No.: US 7,366,107 B2
(45) Date of Patent: Apr. 29, 2008

(54) PORTABLE ELECTRONIC DEVICES INCLUDING ATTACHING CIRCUITS AND METHODS OF OPERATING THE SAME

(75) Inventor: Gregory A. Dunko, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 609 days.

(21) Appl. No.: 10/977,851

(22) Filed: Oct. 29, 2004

(65) Prior Publication Data

US 2006/0092839 A1    May 4, 2006

(51) Int. Cl.
*H04J 1/16* (2006.01)
*H04J 3/16* (2006.01)

(52) U.S. Cl. ..................... 370/252; 370/465
(58) Field of Classification Search ............ None
See application file for complete search history.

(56) References Cited

U.S. PATENT DOCUMENTS

| | | | |
|---|---|---|---|
| 7,260,087 B2* | 8/2007 | Bao et al. | 370/352 |
| 2002/0069297 A1* | 6/2002 | Rasanen et al. | 709/246 |
| 2003/0189951 A1 | 10/2003 | Bi et al. | |
| 2003/0223381 A1* | 12/2003 | Schroderus | 370/285 |
| 2004/0196826 A1* | 10/2004 | Bao et al. | 370/352 |
| 2005/0002407 A1* | 1/2005 | Shaheen et al. | 370/401 |
| 2005/0027837 A1* | 2/2005 | Roese et al. | 709/223 |
| 2005/0180394 A1* | 8/2005 | Kautz et al. | 370/352 |
| 2005/0232241 A1* | 10/2005 | Wu et al. | 370/352 |
| 2006/0045043 A1* | 3/2006 | Crocker et al. | 370/328 |

FOREIGN PATENT DOCUMENTS

| WO | WO 99/05828 | 2/1999 |
|---|---|---|
| WO | WO 02/32177 | 4/2002 |

* cited by examiner

*Primary Examiner*—Andrew C. Lee
(74) *Attorney, Agent, or Firm*—Myers Bigel Sibley & Sajovec, P.A.

(57) ABSTRACT

Portable electronic devices including a transmitter configured to request a packet data session are provided. An attaching circuit configured to collect information about the requested packet data session and determine default parameters of the portable electronic device associated with attaching the portable electronic device to the network based on the collected information are also provided. Related methods of operating portable electronic devices are also discussed.

28 Claims, 3 Drawing Sheets

PORTABLE ELECTRONIC DEVICES INCLUDING ATTACHING CIRCUITS AND METHODS OF OPERATING THE SAME

FIELD OF THE INVENTION

The present invention relates to portable electronic devices and, more particularly, to portable electronic devices having customized network attaching parameters and methods of operating the same.

BACKGROUND OF THE INVENTION

Recently, there has been a proliferation in the field of wireless communications. Portable electronic devices such as cordless and cellular telephones, pagers, wireless modems, wireless email devices, personal digital assistants (PDAs) with communication functions, and other portable electronic devices are becoming commonplace. Many of these portable electronic devices are configured for packet data communication, for example, push to talk (PTT) communications or Internet communications. One example of a packet data communications is General Packet Radio Service (GPRS). GPRS is a radio technology for global system for mobile communications (GSM) networks that adds packet-switching protocols to the GSM networks.

Conventional portable electronic devices configured for GPRS packet data communications typically automatically attach to the network upon power up of the portable electronic device. In many instances, the portable electronic devices automatically attach, though a small percentage of users of these devices actually exploit the packet data capability of the devices. Thus, network resources are being occupied by devices that may rarely, if ever, use the packet data capability of the portable electronic device, limiting traffic on the network. Some mobile network providers have expressed concern with automatic attachment to the network upon power up for these reasons. One solution considered is to disable the auto-attach parameter of the portable electronic device, however, this would negatively affect users that actually use the packet data capabilities due to the delay involved each time the portable electronic device attaches to the network. Accordingly, improved portable electronic devices and related methods may be desired.

SUMMARY OF THE INVENTION

Some embodiments of the present invention provide portable electronic devices including a transmitter configured to request a packet data session. An attaching circuit configured to collect information about the requested packet data session and determine default parameters of the portable electronic device associated with attaching the portable electronic device to the network based on the collected information is also provided.

In further embodiments of the present invention, the transmitter may be further configured to attach the portable electronic device to the network to establish the packet data session. The attaching circuit may be further configured to set the determined default parameters in the portable electronic device. The default parameters may include auto-attach to the network upon power up, remain attached to the network upon completion of the data packet session, detach from the network upon completion of the data packet session, remain attached to the network for the duration of a timer while the mobile terminal is powered on and/or detach from the network upon expiration of a timer.

In still further embodiments of the present invention, the default parameter may be detach from the network upon expiration of a timer. The device may further include a timer circuit configured to run regardless of whether power is supplied to the portable electronic device. The timer circuit may be further configured to reset the timer each time a packet data session is requested.

In some embodiments of the present invention, the collected information may include a type of application associated with the packet data session, a priority of the application, application subscription state, frequency of usage of the application, trends and/or patterns of the application and/or period of time since last use of the application.

In further embodiments of the present invention, the default parameters may be determined using an algorithm that receives the collected information as an input. The attaching circuit may be further configured to disable an auto-attach parameter of the portable electronic device. In certain embodiments of the present invention, the network may include a global system for mobile communications (GSM) network and the packet data session may be provided by a general packet radio service (GPRS).

While the present invention is described above primarily with reference to portable electronic devices, methods of operating portable electronic devices are also provided.

DETAILED DESCRIPTION

Figure 1:
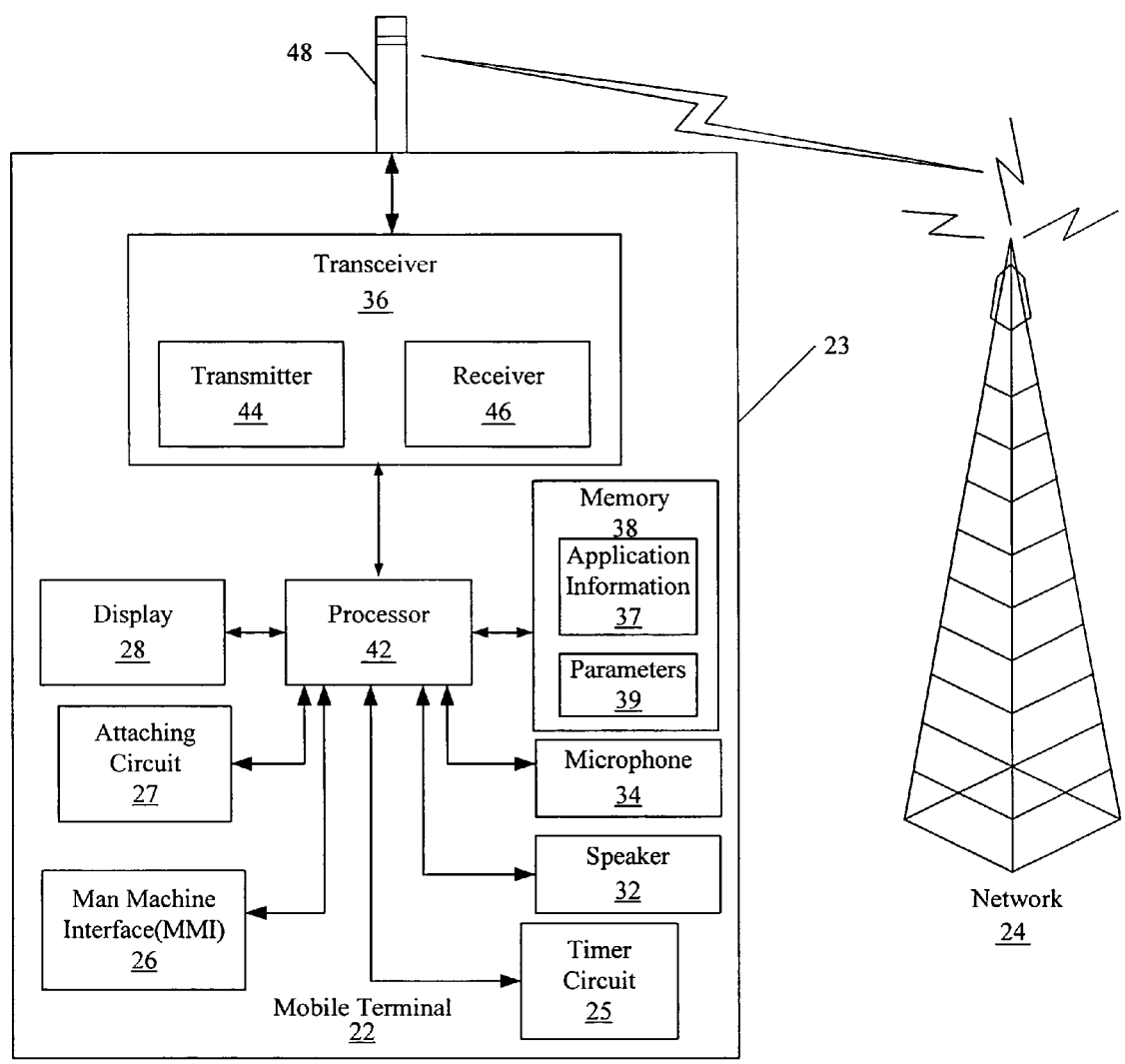
FIG. 1 is a schematic diagram of mobile terminals according to some embodiments of the present invention and an exemplary base station transceiver.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will filly convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items. As will be appreciated by one of skill in the art, the present invention may take the form of an entirely hardware embodiment, an entirely software embodiment or an embodiment combining software and hardware aspects all generally referred to herein as a "circuit" or "module."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will now be described below with respect to FIGS. 1 through 3. Embodiments of the present invention provide portable electronic devices having an auto-attached parameter disabled, such that the portable electronic devices do not automatically attach to the network upon power up. As discussed herein, upon request for a data packet session, portable electronic devices according to embodiments of the present invention, collect and calculate information about the requested data packet session and determine default parameters of the portable electronic device based on the collected and calculated information. Thus, portable electronic devices according to some embodiments of the present invention provide customized attachment procedures based on the actual use of the portable electronic device, possibly reducing the amount of unused bandwidth allocated to devices that do not exploit packet data communications as discussed herein below.

The present invention is described below with reference to schematic and block diagrams of mobile terminals including attaching and timer circuits according to some embodiments of the present invention. Although attaching circuits and timer circuits are discussed herein as being included as part of a mobile terminal, for example, mobile terminals 22 of FIG. 1, embodiments of the present invention are not limited to this configuration. Attaching circuits and timer circuits according to embodiments of the present invention may be included in any portable electronic device configured to communicate with a packet data network without departing from the scope of the present invention.

Referring now to FIG. 1, an exemplary radiotelephone communication system, in accordance with embodiments of the present invention is illustrated, which includes the mobile terminal 22 and a base station transceiver, which is part of a wireless communications network 24. As illustrated the wireless communications network 24 may include a base station transceiver that may be configured to communicate with, for example, a serving GPRS support node (SGSN). The mobile terminal 22 includes a portable housing 23 and may include a man machine interface 26, a display 28, a speaker 32, a microphone 34, a transceiver 36, and a memory 38 including application information 37 and parameters 39, any of which may communicate with a processor 42. Furthermore, mobile terminals 22 according to embodiments of the present invention may further include an attaching circuit 27 and a timer circuit 25, which also communicate with a controller/processor 42. The processor 42 can be any commercially available or custom microprocessor.

The transceiver 36 typically includes a transmitter circuit 44 and a receiver circuit 46, which respectively transmit outgoing radio frequency signals to the network 24 and receive incoming radio frequency signals, such as voice and data signals, from the network 24 via an antenna 48. The antenna 48 may be an embedded antenna, a retractable antenna or any antenna known to those having skill in the art without departing from the scope of the present invention. The radio frequency signals transmitted between the mobile terminal 22 and the network 24 may include both traffic and control signals (e.g., paging signals/messages for incoming calls), which are used to establish and maintain communication with another party or destination. The processor 42 may support various functions of the mobile terminal 22, including an attaching algorithm so as to allow customization of network attachment based on the particular functions of each mobile terminal 22.

As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

In some embodiments of the present invention, the network 24 includes a base station transceiver that includes the radio transceiver(s) that define an individual cell in a cellular network and communicates with the mobile terminal 22 and other mobile terminals in the cell using a radio-link protocol. It will be understood that in some embodiments of the present invention many base station transceivers may be connected through, for example, a mobile switching center and other devices to define a wireless communications network.

Although the present invention may be embodied in communication devices or systems, such as the mobile terminal 22, the present invention is not limited to such devices and/or systems. Instead, the present invention may be embodied in any apparatus that may be configured to attach to a network for packet data communications. Operations of the mobile terminal 22 will now be discussed with respect to FIG. 1. It will be understood that unlike conventional portable electronic devices, the auto-attach parameter of mobile terminals 22 according to some embodiments of the present invention may be disabled. In particular, when conventional portable electronic devices configured for packet data communications, for example, GPRS, are powered on, an automatic attach (GPRS attach) is typically performed. In other words, the GSM network is notified that the portable electronic device is packet capable and the device is made "pageable" via packet applications. Mobile terminals 22 according to some embodiments of the present invention, do not automatically attach, i.e. the auto-attach parameter is initially disabled. As discussed further herein, mobile terminals 22 according to some embodiments of the present invention do not attempt to attach to the network until a packet data session is requested. In some embodiments of the present invention, the network may be a GSM network and the packet data session may be provided by a GPRS. However, any network and/or packet data transmission format may be used without departing from the scope of the present invention.

The transmitter 44 is configured to request a packet data session, for example, the mobile terminal 22. It will be understood that the transmitter 44 may also communicates with the processor 42, the attaching circuit 27 etc. before requesting the packet data session. The packet data session may be, for example, a push to talk (PTT) session, a request for information on the Internet or the like. Once the transmitter 44 initiates requesting the packet data session, the attaching circuit 27 may be configured to run an algorithm to collect and calculate information 37 about the requested packet data session and the usage patterns of the mobile terminal 22. The collected information 37 may include a type of application associated with the packet data session, for example, PTT, a priority of the application, application subscription state, for example, is this user subscribed for PTT, frequency of usage of the application, trends and/or patterns of the application, for example, this application is never used if the portable electronic device is roaming, period of time since last use of the application and/or any combination thereof. The priority information may be customized by the user of the mobile terminal. For example, even though accessing the Internet may typically be a low priority application, a user may customize this to be a high priority application. It will be understood that some of this information may be calculated. In certain embodiments of the present invention, the information may further include frequency of use of any data packet application, not just the requested application, by the mobile terminal 22. In some embodiments of the present invention, the information related to the mobile terminal may be associated with the mobile equipment, with the SIM card or both. For example, if a user removed the SIM card from one mobile terminal to a second mobile terminal, the second mobile terminal may be configured to set the parameter of the second mobile terminal to those used by the first mobile terminal. Thus, if the first mobile terminal was configured to automatically attach, the second mobile terminal may also be configured to automatically attach.

The attaching circuit 27 is further configured to determine the default parameters 39 of the portable electronic device associated with attaching the portable electronic device to the network based on the collected and calculated information. For example, an algorithm may be applied to the collected information and used to determine whether or not the portable electronic device should automatically attach to the network upon subsequent power up. This decision may be based on the collected and calculated information. For example, certain types of applications may be so important that once the mobile terminal 22 uses the application once, the mobile terminal 22 will always attach to the network upon power up. Other types of applications may have to be used a certain number of times, for example, three times, before the auto-attach parameter may be enabled in the mobile terminal 22.

In still further embodiments of the present invention, some applications may cause a timer to be set at the mobile terminal 22 and the mobile terminal will remain attached to the network while the mobile terminal 22 is powered on until the timer expires. Thus, the parameters may include auto-attach to the network upon power up, remain attached to the network upon completion of the data packet session, detach from the network upon completion of the data packet session, remain attached to the network for the duration of a timer while the mobile terminal is powered on and/or detach from the network upon expiration of a timer. Once determined, the attaching circuit 27 may be configured to set the parameters 39 in the mobile terminal 22.

As discussed above, in some embodiments of the present invention where the 5 default parameter is detach from the network upon expiration of a timer, a timer circuit 25 may be set and the mobile terminal 22 may be configured to remain attached to the network while the mobile terminal 22 is powered on until the timer expires. The timer circuit 25 may be configured to run regardless of whether power is supplied to the mobile terminal, i.e. whether the mobile terminal 22 is powered on or off. Although the timer is running while the mobile terminal 22 is powered off, the mobile terminal 22 is not attached to the network while the mobile terminal 22 is powered off. More particularly, the timer circuit 25 may be configured to set a timer that may run regardless of whether power is supplied to the mobile terminal 22.

While the timer is running, the mobile terminal 22 may automatically attach to the network upon power up. Once the timer expires, the default in the mobile terminal 22 may then revert, such that the mobile terminal 22 will not auto-attach when the mobile terminal 22 is powered up. In some embodiments of the present invention, the timer circuit 25 may be configured to reset the timer each time a packet data session is requested. Thus, if a user continuously requests packet data sessions, the mobile terminal 22 may remain attached to the network for a longer period of time.

Once the parameters 39 are set, the mobile terminal 22 is attached to the network using the transmitter 44. Once the mobile terminal 22 is attached to the network, a packet data protocol (PDP) context may be established if the application requests it. The PDP context establishes a connection path between the mobile terminal 22 and the Internet protocol (IP) network. A PDP context is associated with a packet data application. Once the PDP context is established, application data may be passed through temporary block flows (TBFs). When data is available to transport, a TBF is established, the data is sent, and the TBF is taken down. It will be understood that it is not possible to establish a TBF until a PDP context has been activated. Furthermore, it is not possible to activate a PDP context until the mobile device has attached to the network.

Figure 2:
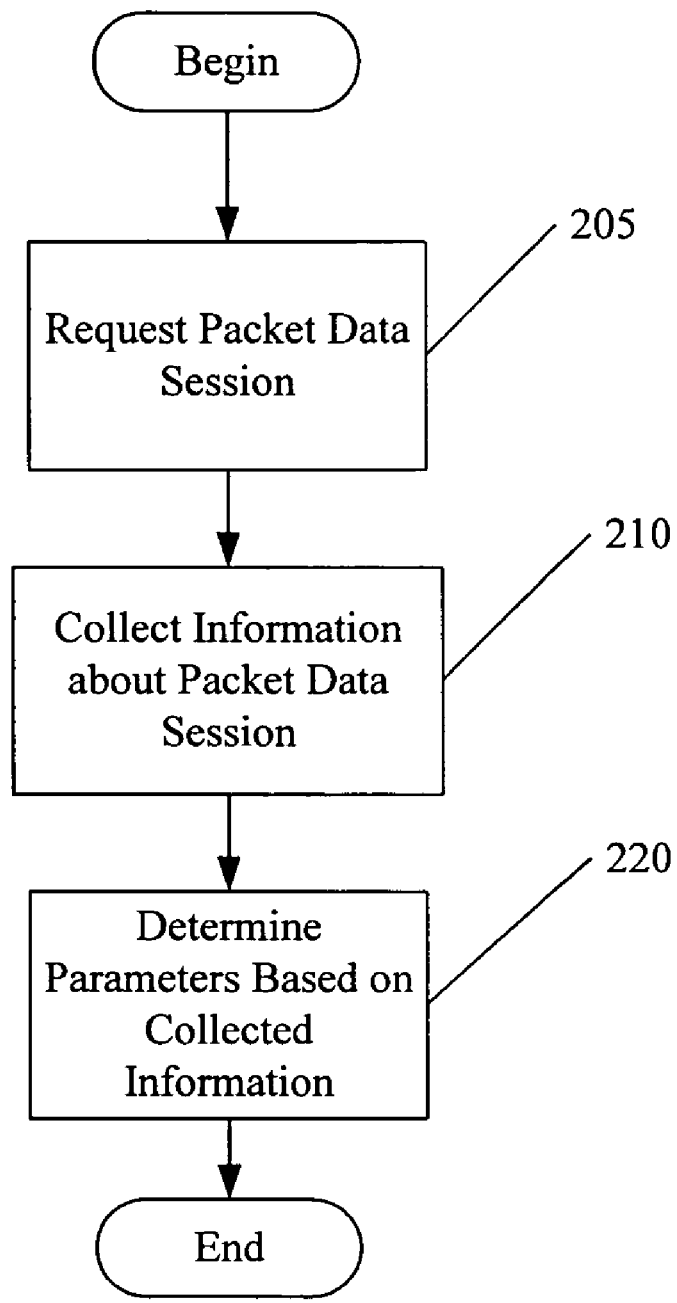
FIG. 2 is a flowchart illustrating operations of portable electronic devices according to some embodiments of the present invention
Figure 3:
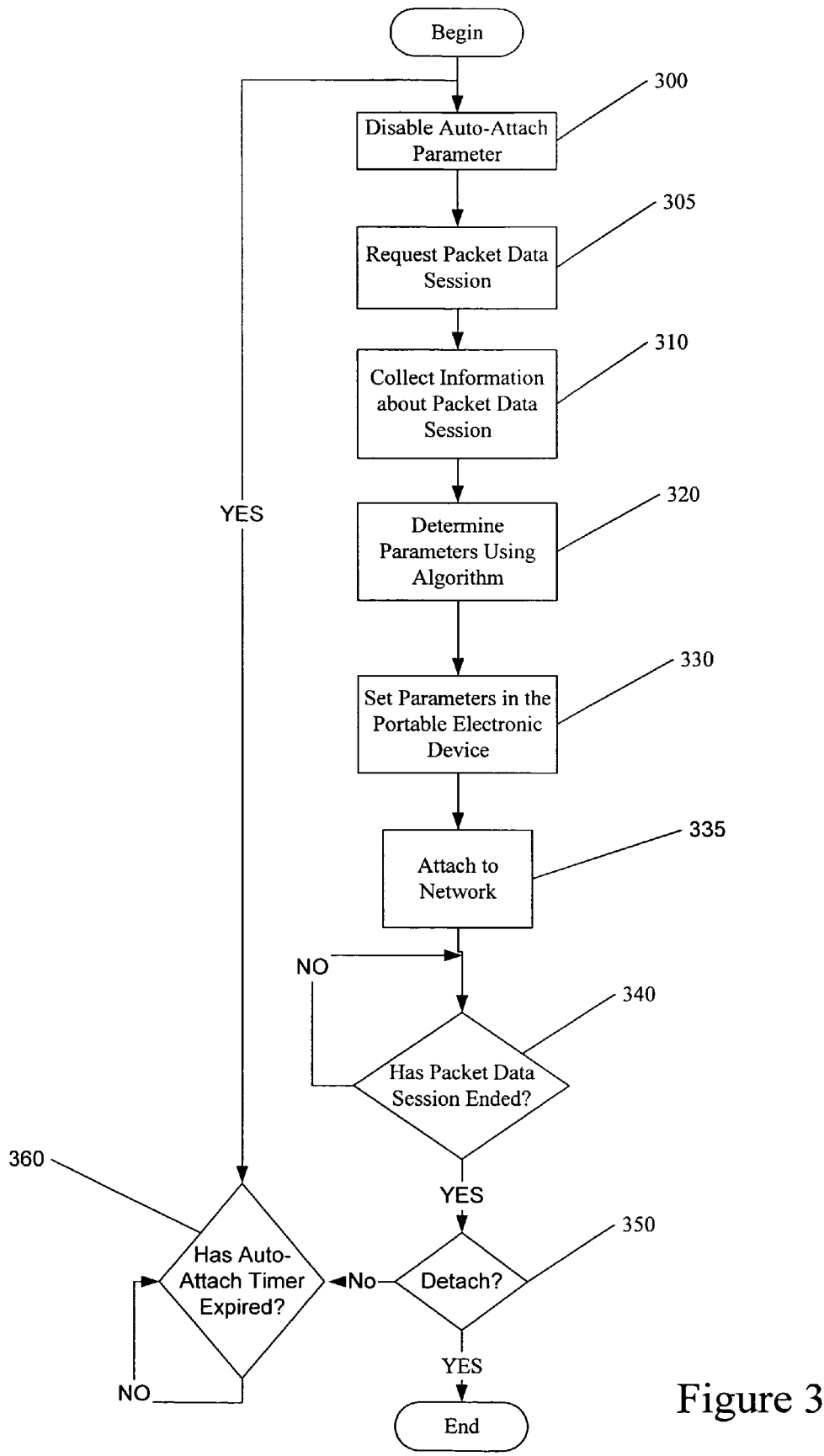
FIG. 3 is a flowchart illustrating operations of portable electronic devices according to further embodiments of the present invention.

Referring now to FIGS. 2 and 3, operations of portable electronic devices configured to attach to a network according to some embodiments of the present invention will be discussed. Referring now to FIG. 2, operations begin at block 205 by requesting a packet data session. The packet data session may be, for example, a push to talk (PTT) session, an Internet session or the like. Once the packet data session has been requested, information about the requested packet data session may be requested (block 210). For example, the information may be how often is the requested application used by this portable electronic device, how often is any packet data application used by this portable electronic device, what is the priority associated with this application, i.e., is this the type of application that will ensure future auto-attach, for example, PTT, what are the usage trend of this portable electronic device, ie., is the phone used to access packet data communications when roaming, is this portable electronic device subscribed to the requested application, how often has this portable electronic device been used to access packet data communications, what is the history of the particular mobile equipment and/or the SIM card and the like.

Once the information has been collected and/or calculated, the default parameters of the portable electronic device associated with attaching the portable electronic device to the network based on the collected information may be determined (block 220). The default parameters may be, for example, auto-attach to the network upon power up, remain attached to the network upon completion of the data packet session, detach from the network upon completion of the data packet session, remain attached to the network for the duration of a timer while the mobile terminal is powered on and/or detach from the network upon expiration of a timer. For example, some applications are so important that if the portable electronic device requests this application once, the portable electronic device will always attach to the network when it is powered up. Furthermore, some applications are less important and the portable electronic device may have to be requested, for example, five times, and then the portable electronic device may only attach to the network for a limited period of time set by a timer.

Referring now to FIG. 3, operations begin at block 300 by disabling an auto-attach parameter of the portable electronic device. In some embodiments of the present invention, the auto-attach parameter of the portable electronic device may be disabled as a default, thus, the disabling of the auto-attach parameter may be performed at the factory before the user obtains the portable electronic device. A packet data session is requested from the portable electronic device (block 305). The packet data session may be, for example, a push to talk (PTT) session, an Internet session or the like. Once the packet data session has been requested, information about the requested packet data session may be requested (block 310). Once the information has been collected, the default parameters of the portable electronic device associated with attaching the portable electronic device to the network based on the collected information may be determined (block 320). In some embodiments of the present invention, the default parameters may be determined using an algorithm that receives the collected information as an input.

Once the default parameters are determined, the default parameters may be set in the portable electronic device (block 330). The portable electronic device may attach to the network (block 335). The network may be a global system for mobile communications (GSM) network and the packet data session may be provided by a general packet radio service (GPRS). It is determined if the packet data session has ended (block 340). If it is determined that the session has not ended, operations remain at block 340 until the session ends. If it is determined that the session has ended, it is determined if the default parameters indicate that the portable electronic device should detach from the network (block 350). If it is determined that the portable electronic device should detach from the network, the portable electronic device detaches and operations end until another data packet session is requested. If it is determined that the portable electronic device should not detach, it is determined if a timer has been set and if it has expired (block 360). If it is determined that the timer has not expired, operations remain at block 360 until the timer expires. In some embodiments of the present invention, the timer may be reset each time a request for a packet data session is received. If it is determined that the timer has expired, the portable electronic device may detach from the network and wait until the next packet data session is requested. In some embodiments of the present invention, the timer may be configured to run even when the portable electronic device is powered off.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of attaching a portable electronic device to a network, comprising:
    requesting a packet data session;
    collecting and/or calculating information about the requested packet data session and usage patterns of the portable electronic device;
    determining customized default parameters of the portable electronic device associated with attaching the portable electronic device to the network based on the collected and/or calculated; and
    setting the determined customized default parameters in the portable electronic device.

2. The method of claim 1, wherein determining is followed by attaching the portable electronic device to the network to establish the packet data session.

3. The method of claim 1, wherein the default parameters comprise auto-attach to the network upon power up, remain attached to the network upon completion of the data packet session, detach from the network upon completion of the data packet session, remain attached to the network for the duration of a timer while the portable electronic device is powered on and/or detach from the network upon expiration of a timer.

4. The method of claim 3, wherein the default parameter comprises detach from the network upon expiration of a timer and wherein the timer runs regardless of whether power is supplied to the portable electronic device.

5. The method of claim 4, wherein the timer is reset each time a packet data session is requested.

6. The method of claim 1, wherein the collected information comprises a type of application associated with the packet data session, a priority of the application, application subscription state, frequency of usage of the application, trends and/or patterns of the application and/or period of time since last use of the application.

7. The method of claim 1, wherein determining default parameters comprises determining the default parameters using an algorithm that receives the collected information as an input.

8. The method of claim 1, wherein requesting is preceded by disabling an auto-attach parameter of the portable electronic device.

9. A method of attaching a portable electronic device to a network, comprising:
    determining customized default parameters of the portable electronic device associated with attaching the portable electronic device to the network based on collected and/or calculated information associated with a packet session request and usage patterns of the portable electronic device; and
    setting the determined default parameters in the portable electronic device.

10. The method of claim 9, wherein determining is preceded by:
    requesting the packet data session; and
    collecting and/or calculating the information associated with the requested packet data session and the usage patterns of the portable electronic device.

11. The method of claim 10, wherein determining is followed by attaching the portable electronic device to the network to establish the packet data session.

12. The method of claim 9, wherein the default parameters comprise auto-attach to the network upon power up, remain attached to the network upon completion of the data packet session, detach from the network upon completion of the data packet session, remain attached to the network for the duration of a timer while the portable electronic device is powered on and/or detach from the network upon expiration of a timer.

13. The method of claim 12, wherein the default parameter comprises detach from the network upon expiration of a timer and wherein the timer runs regardless of whether power is supplied to the portable electronic device.

14. The method of claim 13, wherein the timer is reset each time a packet data session is requested.

15. The method of claim 9, wherein the collected information comprises a type of application associated with the packet data session, a priority of the application, application subscription state, frequency of usage of the application, trends and/or patterns of the application and/or period of time since last use of the application.

16. The method of claim 9, wherein determining default parameters comprises determining the default parameters using an algorithm that receives the collected information as an input.

17. The method of claim 10, wherein requesting is preceded by disabling an auto-attach parameter of the portable electronic device.

18. A portable electronic device, comprising:
 a transmitter configured to request a packet data session; and
 an attaching circuit configured to collect and/or calculate information about the requested packet data session and usage patterns of the portable electronic device, determine customized default parameters of the portable electronic device associated with attaching the portable electronic device to the network based on the collected information, and set the determined default parameters in the portable electronic device.

19. The portable electronic device of claim 18, wherein the transmitter is further configured to attach the portable electronic device to the network to establish the packet data session.

20. The portable electronic device of claim 18, wherein the default parameters comprise auto-attach to the network upon power up, remain attached to the network upon completion of the data packet session, detach from the network upon completion of the data packet session, remain attached to the network for the duration of a timer while the portable electronic device is powered on and/or detach from the network upon expiration of a timer.

21. The portable electronic device of claim 20, wherein the default parameter comprises detach from the network upon expiration of a timer, the device further comprising a timer circuit configured to run regardless of whether power is supplied to the portable electronic device.

22. The portable electronic device of claim 21 wherein the timer circuit is further configured to reset the timer each time a packet data session is requested.

23. The portable electronic device of claim 18, wherein the collected information comprises a type of application associated with the packet data session, a priority of the application, application subscription state, frequency of usage of the application, trends and/or patterns of the application and/or period of time since last use of the application.

24. The portable electronic device of claim 18, wherein determining default parameters comprises determining the default parameters using an algorithm that receives the collected information as an input.

25. The portable electronic device of claim 18, wherein the attaching circuit is further configured to disable an auto-attach parameter of the portable electronic device.

26. The method of claim 1, wherein setting is followed by repeatedly attaching and/or detaching the portable electronic device to the network based in the stored customized default parameters.

27. The method of claim 9, wherein setting is followed by repeatedly attaching and/or detaching the portable electronic device to the network based in the stored customized default parameters.

28. The portable electronic device of claim 18, wherein the attaching circuit is further configured to repeatedly attach and/or detach the portable electronic device to the network based in the stored customized default parameters.

* * * * *